United States Patent
Luo et al.

(10) Patent No.: US 9,130,708 B2
(45) Date of Patent: Sep. 8, 2015

(54) METHOD AND APPARATUS FOR BUNDLING RESOURCE BLOCKS IN WIRELESS COMMUNICATION

(75) Inventors: Tao Luo, San Diego, CA (US); Wanshi Chen, San Diego, CA (US); Peter Gaal, San Diego, CA (US); Xiaoxia Zhang, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 768 days.

(21) Appl. No.: 13/162,269

(22) Filed: Jun. 16, 2011

(65) Prior Publication Data
US 2012/0188950 A1    Jul. 26, 2012

Related U.S. Application Data

(60) Provisional application No. 61/356,171, filed on Jun. 18, 2010.

(51) Int. Cl.
```
H04W 72/04    (2009.01)
H04L 5/00     (2006.01)
H04B 7/02     (2006.01)
```

(52) U.S. Cl.
CPC ............ *H04L 5/0032* (2013.01); *H04L 5/0035* (2013.01); *H04B 7/024* (2013.01)

(58) Field of Classification Search
None
See application file for complete search history.

(56) References Cited

U.S. PATENT DOCUMENTS

| | | | |
|---|---|---|---|
| 8,238,483 B2 | 8/2012 | Erell et al. | |
| 8,780,829 B2 | 7/2014 | Koo et al. | |
| 2010/0067604 A1* | 3/2010 | Bhadra et al. | 375/267 |
| 2010/0098012 A1 | 4/2010 | Bala et al. | |
| 2011/0170498 A1* | 7/2011 | Liu et al. | 370/329 |
| 2011/0305211 A1 | 12/2011 | Lunttila et al. | |
| 2012/0155366 A1 | 6/2012 | Zirwas et al. | |
| 2012/0329468 A1* | 12/2012 | Chmiel et al. | 455/450 |

FOREIGN PATENT DOCUMENTS

| | | |
|---|---|---|
| CN | 101741693 A | 6/2010 |
| JP | 2012004609 A | 1/2012 |

(Continued)

OTHER PUBLICATIONS

Pantech, R1-092593, "Consideration on determining cooperative eNBs in Joint Transmission CoMP scheme." Los Angeles, US, Jun. 29-Jul. 3, 2009. (Discusses concerns with overheard for ComP schemes).*

(Continued)

*Primary Examiner* — Ayaz Sheikh
*Assistant Examiner* — Tarell Hampton
(74) *Attorney, Agent, or Firm* — Seyfarth Shaw LLP

(57) ABSTRACT

Methods and apparatuses are provided for bundling resource blocks (RB) for varying bandwidth scenarios in wireless communication. Where multiple access points form a coordinated multiple point (CoMP) set for a device, the access points may be configured to use a common RB bundling size for precoding transmissions to the device. In another aspect, where a device is allocated a bandwidth and a bandwidth extension, a RB bundling size may be determined for the bandwidth and bandwidth extension, jointly or individually. The RB bundling size may be determined based on the bandwidth or on the bandwidth and the bandwidth extension.

38 Claims, 11 Drawing Sheets

(56) References Cited

FOREIGN PATENT DOCUMENTS

KR       20100065048 A    6/2010
WO        2010068011 A2   6/2010

OTHER PUBLICATIONS

Alcatel-Lucent Shanghai Bell et al: "Efficient uplink coordinated multi-point reception with reduced backhauling cost", 3GPP Draft; R1-092146, Apr. 28, 2009, XP050339589, France [retrieved on Apr. 28, 2009].
International Search Report and Written Opinion—PCT/US2011/041000—ISA/EPO—Nov. 7, 2011.
Qualcomm Europe: "UE-RS Patterns for LTE-A", 3GPP Draft; R1-093105, No. Shenzhen, China; 20090819, Aug. 19, 2009, XP050351482, France [retrieved on Aug. 19, 2009].
Qualcomm Europe: "UE-RS Patterns for ranks 5 to 8 of LTE-A", 3GPP Draft, R1-094212 UE RS Patterns for Rank 5-8, 3rd Generation Partnership Project (3GPP), Mobile Competence Centre, 650, Route Des Lucioles, F-06921 Sophia-Antipolis Cedex, France, No. Miyazaki, 20091012, Oct. 12, 2009, XP050388682, [retrieved on Oct. 7, 2009].
Samsung: "Discussion on DM-RS for LTE-i Advanced", 3GPP Draft;R1-094088 DM Rs Designs in Lie-A, 3rd Generation Partnership Project (3GPP), Mobile Competence Centre ; 650, Route Des Lucioles ; F-06921 Sophia-Antipolis.
Cedex ; France, No. Miyazaki; 20091012, Oct. 12, 2009, XP050388565.
Texas Instruments: "Network MIMO Precoding" 3rd Generation Partnership Project (3GPP) TSG RAN WG1 #53bis; No. R1-082497, Jul. 4, 2008, pp. 1-4, XP002559609.
Catt: "Consideration on CoMP in RAN3", 3GPP Draft; R3-091245, 3rd Generation Partnership Project (3GPP), Mobile Competence Centre ; 650, Route Des Lucioles ; F-06921 Sophia-Antipolis Cedex ; France, No. San Francisco, USA; 20090429, Apr. 29, 2009, XP050341603, [retrieved on Apr. 29, 2009].
Panasonic: "Discussion on PUCCH coordination for UL CoMP", 3GPP Draft; R1-091165, 3rd Generation Partnership Project (3GPP), Mobile Competence Centre ; 650, Route Des Lucioles ; F-06921 Sophia-Antipolis Cedex ; France, No. Seoul, Korea; 20090317, Mar. 17, 2009, XP050338786, [retrieved on Mar. 17, 2009].
Samsung: "Discussion on RB Bundling for DM-RS", 3GPP Draft; R1-102187 RB Boundling, 3rd Generation Partnership Project (3GPP), Mobile Competence Centre; 650, Route Des Lucioles; F-06921 Sophia-Anti Polis Cedex; France, vol. RAN WG1, No. Beijing, china; 20100412, Apr. 6, 2010, XP050419467, pp. 1-5.
Samsung, "PRB bundling for Rel-10," 3GPP TSG-RAN WG1#61R1-103016, May 14, 2010, pp. 1-6.
Catt, "Aspects of Joint Processing in Downlink CoMP", 3GPP Draft, R1-090193, 3rd Generation Partnership Project (3GPP), Mobile Competence Centre , 650, Route Des Lucioles , F-06921 Sophia-Antipolis Cedex , France, No. Ljubljana, 20090108, Jan. 8, 2009, XP050318126.
Motorola: "RV for UL Subframe Bundling," TSG-RAN WG1 #52bis, R1-081304, Shenzhen, China, Mar. 31-Apr. 4, 2008, 2 pages.

\* cited by examiner

METHOD AND APPARATUS FOR BUNDLING RESOURCE BLOCKS IN WIRELESS COMMUNICATION

CROSS-REFERENCE TO RELATED APPLICATION

The present Application for Patent claims priority to Provisional Application No. 61/356,171 entitled "BUNDLING OF RESOURCE BLOCKS FOR WIRELESS COMMUNICATION" filed Jun. 18, 2010, and assigned to the assignee hereof and hereby expressly incorporated by reference herein.

BACKGROUND

1. Field

The following description relates generally to wireless network communications, and more particularly to bundled resource block assignments.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth and transmit power). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), and the like.

Generally, wireless multiple-access communication systems may simultaneously support communication for multiple mobile devices. Each mobile device may communicate with one or more access points via transmissions on forward and reverse links. The forward link (or downlink) refers to the communication link from access points to mobile devices, and the reverse link (or uplink) refers to the communication link from mobile devices to access points. Further, communications between mobile devices and access points may be established via single-input single-output (SISO) systems, multiple-input single-output (MISO) systems, multiple-input multiple-output (MIMO) systems, and so forth.

In one example, an access point can bundle resource blocks (RB) allocated to a mobile device for applying a precoding thereto. The access point can apply a similar precoding matrix or vector to a given number of bundled RBs, and can transmit the precoded RBs to the mobile device. The mobile device can determine the number of RBs in a bundle, and can remove the precoding from the RBs based on the precoder. The RB bundling size can be configured by the access point and signaled to the mobile device, hardcoded at the access point and/or mobile device, and/or the like. The resource bundling size can correspond to a transmission bandwidth utilized by the access point. For example, an access point that uses a 10 megahertz (MHz) bandwidth may configure a RB bundling size of three RBs, while an access point that uses a 5 MHz bandwidth may configure a RB bundling size of two RBs.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that follows.

According to an aspect, a method of wireless communication is provided. The method includes determining a set of access points supporting coordinated transmission for a device and determining a common resource block bundling size for the set of access points to utilize in precoding transmissions for the device. The method also includes bundling a plurality of resource blocks based at least in part on the common resource block bundling size.

In another aspect, an apparatus for wireless communication is provided. The apparatus includes at least one processor configured to determine a set of access points supporting coordinated transmission for a device and to determine a common resource block bundling size for the set of access points to utilize in precoding transmissions for the device. The at least one processor is further configured to bundle a plurality of resource blocks based at least in part on the common resource block bundling size. The apparatus also includes a memory coupled to the at least one processor.

In yet another aspect, an apparatus for wireless communication is provided that includes means for determining a set of access points supporting coordinated transmission for a device and means for determining a common resource block bundling size for the set of access points to utilize in precoding transmissions for the device. The apparatus further includes means for bundling a plurality of resource blocks based at least in part on the common resource block bundling size.

In another aspect, a computer-program product is provided which includes a computer-readable medium. The computer-readable medium includes instructions for causing at least one computer to determine a set of access points supporting coordinated transmission for a device and instructions for causing the at least one computer to determine a common resource block bundling size for the set of access points to utilize in precoding transmissions for the device. The computer-readable medium further includes instructions for causing the at least one computer to bundle a plurality of resource blocks based at least in part on the common resource block bundling size.

According to another aspect, a method of wireless communication is provided which includes determining a resource block bundling size related to a resource allocation including a bandwidth and a bandwidth extension. The method also includes utilizing the resource block bundling size to precode or remove precoding from a plurality of resource blocks.

In another aspect, an apparatus for wireless communication is provided. The apparatus includes at least one processor configured to determine a resource block bundling size related to a resource allocation including a bandwidth and a bandwidth extension. The at least one processor is further configured to utilize the resource block bundling size to precode or remove precoding from a plurality of resource blocks. The apparatus also includes a memory coupled to the at least one processor.

In yet another aspect, an apparatus for wireless communication is provided that includes means for determining a resource block bundling size related to a resource allocation including a bandwidth and a bandwidth extension. The apparatus further includes means for utilizing the resource block bundling size to precode or remove precoding from a plurality of resource blocks.

In another aspect, a computer-program product is provided which includes a computer-readable medium. The computer-readable medium includes instructions for causing at least one computer to determine a resource block bundling size related to a resource allocation including a bandwidth and a bandwidth extension. The computer-readable medium further includes instructions for causing the at least one computer to utilize the resource block bundling size to precode or remove precoding from a plurality of resource blocks.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
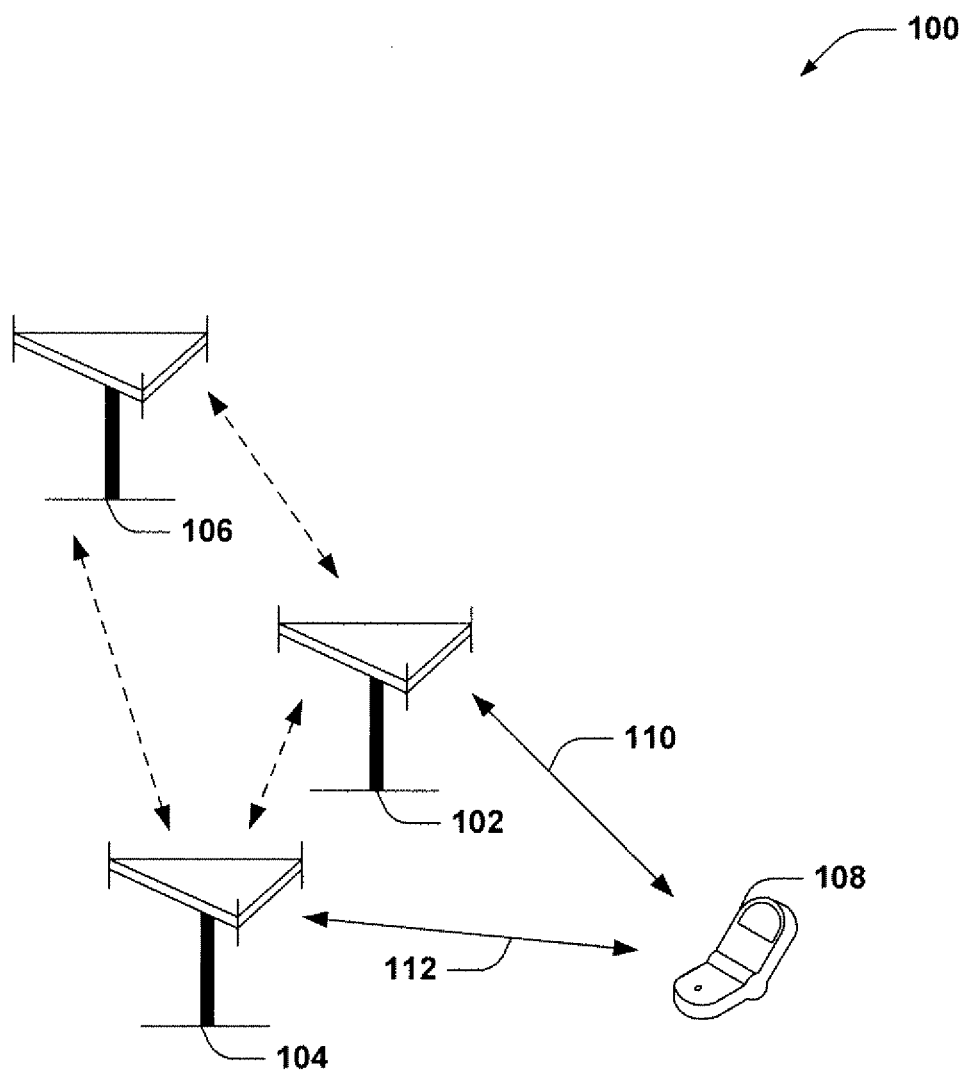
FIG. 1 illustrates a system that supports coordinated multiple point (CoMP) communications to a device.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, resource block (RB) bundling size can be determined for cases where a device can experience more than one transmission bandwidth. For example, in coordinated multiple point (CoMP) communications, a common RB bundling size can be determined and utilized for access points in a CoMP set for a given device. In another example, resource bundling can be disabled for CoMP communications. Moreover, where an access point utilizes a bandwidth extension in communicating with a device, the device can derive the RB bundling size used by the access point for an original bandwidth and/or a combination of the bandwidth with the bandwidth extension. Thus, in either case, a common RB bundling size is used by one or more access points and a corresponding device so that the device can remove a precoding from RBs communicated by the one or more access points. Though generally described in terms of downlink communications, it is to be appreciated that the concepts herein can apply to uplink communications as well.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal. A terminal may be referred to as a system, device, subscriber unit, subscriber station, mobile station, mobile, mobile device, remote station, remote terminal, access terminal, user terminal, communication device, user agent, user device, or user equipment (UE). A terminal may be a cellular telephone, a satellite phone, a cordless telephone, a Session Initiation Protocol (SIP) phone, a wireless local loop (WLL) station, a personal digital assistant (PDA), a tablet, a handheld device having wireless connection capability, a computing device, or other processing devices connected to a wireless modem. Moreover, various aspects are described herein in connection with a base station. A base station may be utilized for communicating with a terminal and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16

(WiMAX), IEEE 802.20, Flash-OFDM®, etc. UTRA and E-UTRA are part of Universal Mobile Telecommunication System (UMTS). 3GPP LTE is a release of UMTS that uses E-UTRA, which employs OFDMA on the downlink and SC-FDMA on the uplink. Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 that supports CoMP communications. System 100 includes a plurality of access points 102, 104, and/or 106, at least a portion of which can communicate with a device 108. For example, access points 102, 104, and/or 106 can each be a macrocell, femtocell, or picocell access point, a mobile base station, a relay node, a device (e.g., communicating in peer-to-peer or ad-hoc mode with device 108), a portion thereof, and/or the like. Moreover, device 108 can be a UE, modem (or other tethered device), a portion thereof, and/or the like.

For example, the access points 102, 104, and/or 106 can provide CoMP communications to device 108, such that the access points 102, 104, and/or 106 can transmit similar signals over similar resources to device 108 (e.g., access point 102 can transmit signal 110, access point 104 can transmit signal 112, etc.). This can improve throughput in the system 100 since device 108 can simultaneously receive and process signals from at least a portion of access points 102, 104, and/or 106. In the depicted example, access points 102 and 104 can be specified for communicating with device 108, and can thus be in the CoMP set for device 108. As device 108 moves throughout the wireless network, additional access points, such as access point 106, can be added to the CoMP set for device 108 and/or some access points, such as access points 102 and/or 104 can be removed from the CoMP set. This can be based at least in part on change in radio conditions at the access points 102, 104, and/or 106, for example, such that the access points in the CoMP set provide at least a threshold quality of communications to device 108 (e.g., based on signal-to-noise ratio (SNR)).

Moreover, at least one of access points 102 and/or 104 can be a serving access point of device 108 such that device 108 can communicate control information to the serving access point while communicating user plane data with all access points in the CoMP set. In addition, device 108 can indicate access points in the CoMP set to the serving access point, and/or the serving access point can select access points for the CoMP set based on a measurement report provided to the serving access point from device 108, as device 108 moves throughout the wireless network.

As described, a RB bundling size can typically be based on transmission bandwidth. Transmission bandwidth among access points 102 and 104 can vary, though the carrier frequency at which the transmission bandwidth is centered may be similar to allow simultaneously receiving related signals at device 108. For example, access point 104 can be a femtocell or other smaller scale access point that utilizes a smaller transmission bandwidth than access point 102, which can be a macrocell access point. In any case, where the transmission bandwidth varies, the RB bundling size may also vary between access points 102 and 104. Thus, as described herein, access points 102 and 104 can utilize the same RB bundling size when communicating with device 108. As such, the described aspects include apparatus and methods of one or more of coordinating the common RB bundling size, computing the size individually, refraining from using RB bundling for CoMP communications, etc. Though two access points 102 and 104 are shown in the CoMP set for device 108, it is to be appreciated that additional access points can be in the CoMP set, and the concepts described herein can be accordingly applied for the additional access points in the CoMP set.

For example, access point 102 can be the serving access point of device 108 in a CoMP set which also includes access point 104. In one example, the RB bundling size of the serving access point 102 can be utilized by the access points in the CoMP set. Thus, access point 102 can communicate the RB bundling size to access points in the CoMP set, including access point 104, and access point 104 can utilize the RB bundling size of serving access point 102 in communicating with device 108. In another example, the RB bundling size can be computed as a function of bundling sizes across access points 102 and 104 in the CoMP set, and/or those access points in the CoMP set participating in a given transmission. In this example, a RB bundling size can be communicated among access points 102 and 104 in the CoMP set and/or to the serving access point 102. Access points 102 and 104 can each individually compute a RB bundling size for the set, and/or serving access point 102 can compute the RB bundling size and provide the size to other access points 104 in the CoMP set (e.g., using the same algorithm). In yet another example, access points 102 and 104 in the CoMP set can refrain from bundling RBs for CoMP communications. Further, for example, the determined RB bundling size can be used by access points 102 and/or 104 in the CoMP set for device 108 for a given transmission, a given period of time, while the CoMP set remains unmodified.

Figure 2:
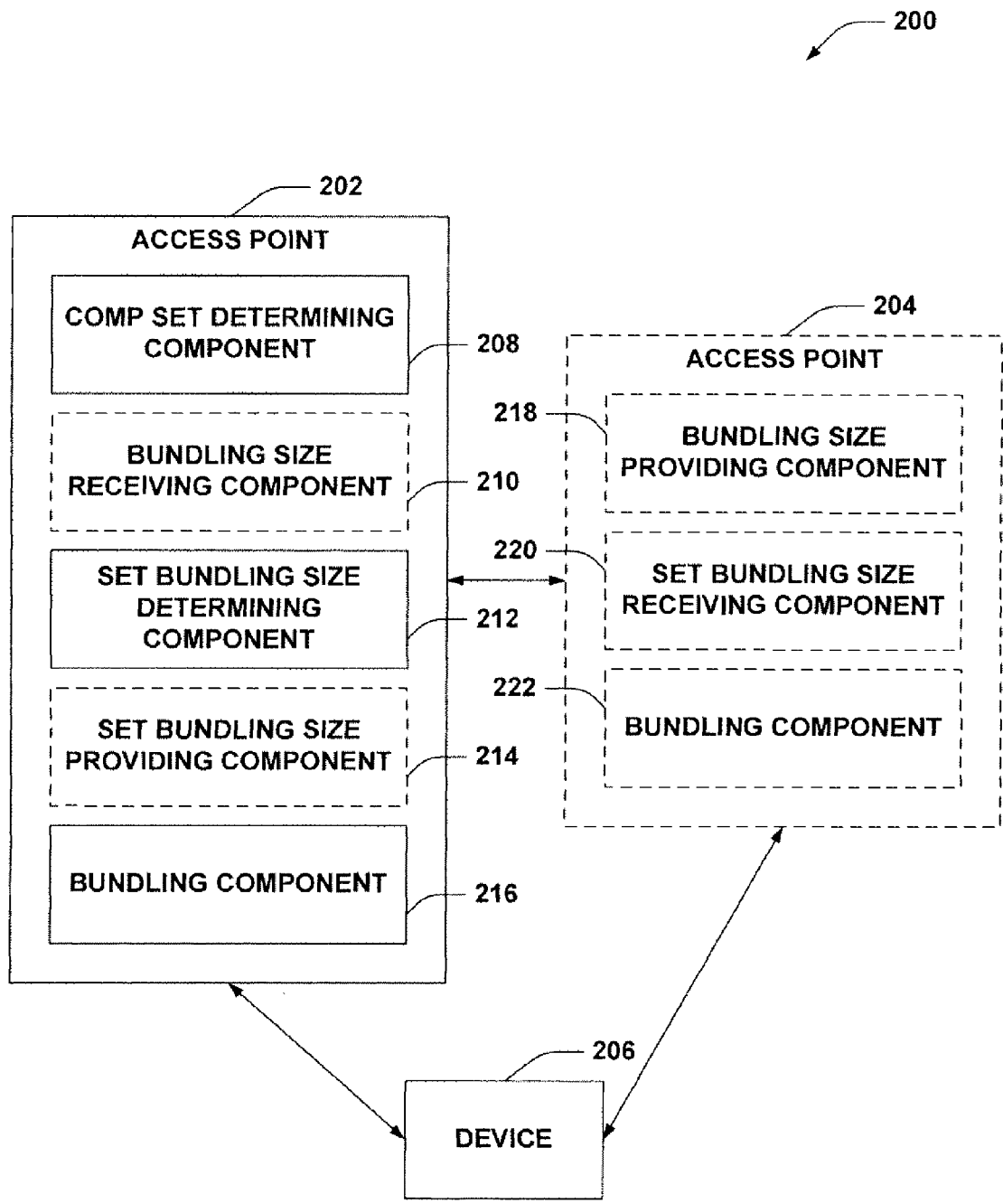
FIG. 2 is a block diagram of a system for determining a resource block (RB) bundling size for access points in a CoMP set.

Referring to FIG. 2, illustrated is a wireless communication system 200 that facilitates determining a RB bundling size for access points in a CoMP set. System 200 can include access point 202 and optionally access point 204 that can be in a CoMP set for a device 206. In one example, this can correspond to access point 202 and/or 204 not only being in the CoMP set, but also available for transmitting at a particular subframe or frequency domain resource to device 206. Thus, access points 202 and 204 can transmit similar signals over similar resources to device 206. As described, access points 202 and 204 can each be a macrocell, femtocell, picocell, or similar access point, a portion thereof, etc., and device 206 can be a UE, modem (or other tethered device), a portion thereof, and/or the like.

Access point 202 can comprise a CoMP set determining component 208 for discerning one or more access points in a CoMP set for a given device, and an optional bundling size receiving component 210 for obtaining a RB bundling size utilized by one or more access points in the CoMP set. Access point 202 can also comprise a set bundling size determining component 212 for determining a RB bundling size for a CoMP set, an optional set bundling size providing component 214 for specifying the RB bundling size for the CoMP set to one or more other access points in the CoMP set, and/or a bundling component 216 for bundling RBs according to the RB bundling size for the CoMP set.

Access point 204 can optionally include a bundling size providing component 218 for indicating a RB bundling size utilized for non-CoMP communications to one or more access points in a CoMP set, a set bundling size receiving component 220 for obtaining a RB bundling size for a CoMP set, and/or a bundling component 222 for bundling RBs according to the RB bundling size for the CoMP set.

According to one example, access point 202 can be a serving access point of device 206, such that device 206 communicates control data with access point 202 while communicating user plane data with additional access points in the CoMP set including access point 202 and 204. In this example, access points 202 and 204 can utilize a RB bundling size of serving access point 202 for precoding bundled RBs. Thus, in an example, CoMP set determining component 208 can determine that device 206 communicates with multiple access points in a CoMP set. For example, access point 202 can maintain a CoMP set for device 206 at least in part by determining access points to add to the CoMP set based on measurement reports received from device 206, receiving identifiers of additional access points from device 206, etc. For example, access point 202 can associate access point 204 in a CoMP set for device 206, and can communicate over a wired or wireless backhaul connection therewith to coordinate transmissions to the device 206. In this example, CoMP set determining component 208 can obtain identifiers for access points in the CoMP set for device 206 as maintained by access point 202. In either case, CoMP set determining component 208 can obtain identifiers related to access points in a CoMP set for device 206.

Set bundling size determining component 212 can determine a local RB bundling size utilized by the serving access point 202 for non-CoMP communications as the RB bundling size for the CoMP set. For example, as described, this can be based at least in part on a local transmission bandwidth for access point 202 (e.g., a transmission bandwidth utilized by access point 202 for communicating with one or more devices). In a specific example, for 10 MHz local transmission bandwidth, access point 202 can use a RB bundling size of three RBs. For a 5 MHz local transmission bandwidth, access point 202 can use a RB bundling size of two RBs. In any case, set bundling size providing component 214 can communicate the RB bundling size for the CoMP set to other access points in the CoMP set (e.g., over the backhaul connection), such as access point 204.

In one example, set bundling size receiving component 220 can obtain the RB bundling size for the CoMP set from serving access point 202 for communicating with device 206, and bundling component 222 can accordingly bundle RBs for transmitting to device 206 according to the received bundling size for the CoMP set. In addition, set bundling size providing component 214 can communicate the RB bundling size for the CoMP set to device 206. Thus, device 206 can receive signals from access points 202 and 204 that are bundled according to the same RB bundling size, and can accordingly remove precoding from the signals using the received RB bundling size. As described above, though transmission bandwidth can vary among access points 202 and 204, it is to be appreciated that the transmission bandwidth at access point 204 and the local transmission bandwidth at serving access point 202 can include similar portions of frequency (e.g., the bandwidths can be centered at the same carrier frequency) to facilitate simultaneously receiving the CoMP communications at device 206.

In another example, access point 202, whether a serving access point of device 206 or otherwise, can compute a RB bundling size for a CoMP set as a function of a local RB bundling size and other RB bundling sizes of the access points in the CoMP set (e.g., based on a local transmission bandwidth and/or a transmission bandwidth of the other access points in the CoMP set). In this example, bundling size receiving component 210 can obtain a RB bundling size utilized by access point 204, and/or other access points in the CoMP set for device 206, for non-CoMP communications (e.g., a RB bundling size based on a transmission bandwidth of the corresponding access point). In one example, device 206 can provide the RB bundling size or transmission bandwidth in a measurement report. In another example, bundling size receiving component 210 can request the RB bundling size or transmission bandwidth from access point 204 and other access points in the CoMP set, and bundling size providing component 218 can indicate the RB bundling size, transmission bandwidth, or other indicator from which RB bundling size can be derived to access point 202. Set bundling size determining component 212 can compute a RB bundling size for the CoMP set based at least in part on the local RB bundling size and the RB bundling sizes received or derived for other access points in the CoMP set.

In one example, set bundling size determining component 212 can select a RB bundling size as the minimum function of the received RB bundling sizes and the local RB bundling size utilized by access point 202. In another example, set bundling size determining component 212 can use a maximum function, mean average function, median average function, etc. of the received RB bundling sizes and/or local RB bundling size. In an example, access point 202 can be the serving access point for device 206 and can collect the RB bundling sizes for each access point in the CoMP set for device 206. In this example, set bundling size providing component 214 can communicate the computed RB bundling size for the CoMP set to each access point in the CoMP set, as described (e.g., and set bundling size receiving component 220 of other access points in the CoMP set, such as access point 204, can receive the RB bundling size for the CoMP set). In another example, each access point in the CoMP set can be similar to access point 202, and can thus receive RB bundling sizes from each access point in the CoMP set and independently compute a RB bundling size for the CoMP set based on a local RB bundling size and the received RB bundling sizes, where the access points in the CoMP set all use the same computation algorithm.

In either case, set bundling size providing component 214 can similarly communicate the RB bundling size for the CoMP set to device 206 (e.g., over one or more control channels such as physical downlink control channel (PDCCH), etc.), and bundling component 216 and/or bundling component 222 can bundle RBs according to the RB bundling size for applying a precoding thereto. Moreover, where the above is applied to access points in the CoMP set that are transmitting to device 206 over a given subframe or frequency domain resource, for example, set bundling size providing component 214 can additionally signal the set of access points in the CoMP set to device 206.

Further, in another example, device 206 can comprise components to compute the RB bundling size and can communicate the RB bundling size to the access points in the CoMP set. Thus, device 206 can include a bundling size receiving component 210 for obtaining RB bundling sizes utilized by access points in the CoMP set, such as access points 202 and 204, for non-CoMP communications. Device 206 can additionally include, a set bundling size determining component 212 for computing a RB bundling size for the CoMP set, and a set bundling size providing component 214 for communicating the RB bundling size to access points in the CoMP set, such as access points 202 and 204.

In other examples, another node of the wireless network can specify the RB bundling size for the CoMP set, such as a operations, administration, and management (OAM) procedure, access point gateway, etc. (not shown). This can be similarly computed by the node using the components as described, specified based at least in part on obtaining the RB bundling size of the serving cell in the CoMP set.

In another example, CoMP set determining component 208 can determine that device 206 communicates with multiple access points in a CoMP set, and set bundling size determining component 212 can determine to disable RB bundling to mitigate conflicting RB bundling among access points in the CoMP set. in this example, access point 202 can be a serving or other access point in the CoMP set. in addition, set bundling size providing component 214 can indicate to device 206 that RB bundling is disabled, or that the RB bundling size is zero (e.g., by signaling over the control channel). In another example, device 206 can assume RB bundling is disabled based at least in part on determining multiple access points in the CoMP set for device 206.

Figure 3:
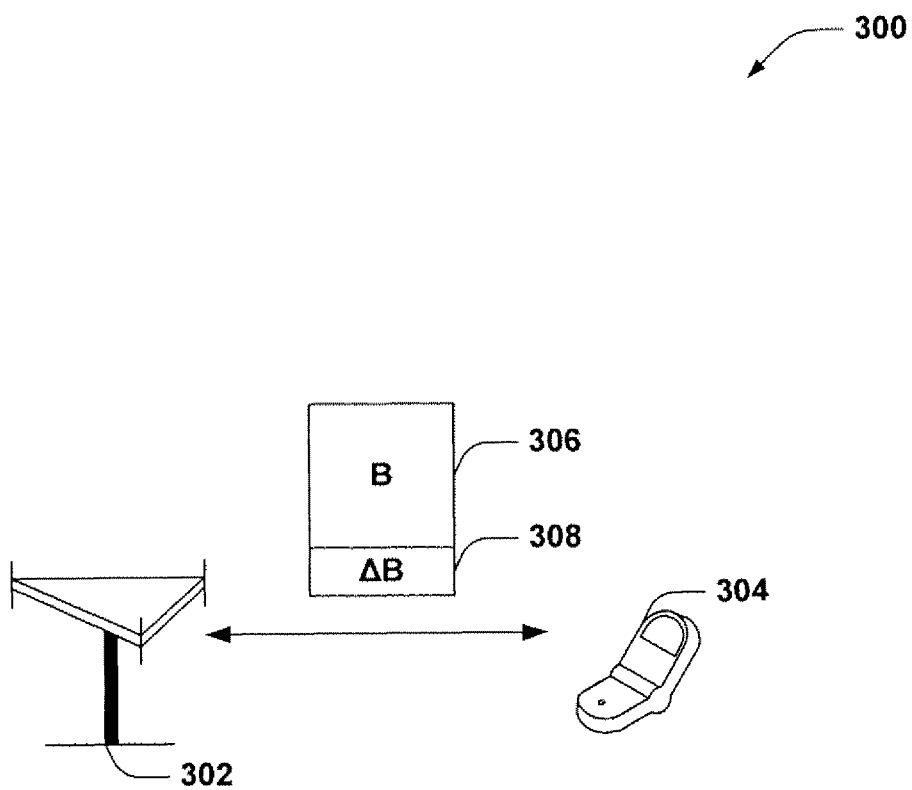
FIG. 3 illustrates a system for allocating resources including a bandwidth extension to a device.

Referring to FIG. 3, illustrated is a wireless communication system 300 that supports communications using a bandwidth extension. System 300 includes an access point 302 that can communicate with a device 304 in a wireless network. As described, access point 302 can be a macrocell, femtocell, picocell, or similar access point, a mobile base station, relay. etc., and device 304 can be a UE, modem, etc. For example, access point 302 can allocate resources to device 304 for communicating therewith including a bandwidth 306 and a bandwidth extension 308. For example, the bandwidth extension 308 can relate to an adjacent or non-adjacent carrier of the same or different wireless communication technology as bandwidth 306, where bandwidth 306 can be a base bandwidth of a wireless communication technology. For example, access point 302 can assign the bandwidth extension 308 to device 304 to facilitate providing additional communication resources to increase bandwidth, improve quality of communications, and/or the like.

In this example, device 304 derives a RB bundling size for joint communications from access point 302 over bandwidth 306 and bandwidth extension 308, or individually for the given bandwidth 306 and bandwidth extension 308. For example, for a joint RB bundling size for bandwidth 306 and bandwidth extension 308, device 304 can derive the RB bundling size based at least in part on a determined RB bundling size based on bandwidth 306 alone, or for a determined RB bundling size based on bandwidth 306 and bandwidth extension 308 (e.g., based on a total size of the bandwidth plus the bandwidth extension). Similarly, access point 302 can utilize a RB bundling size for the joint or individual communication RBs over bandwidth 306 and bandwidth extension 308. In an example, access point 302 can signal details regarding the RB bundling to device 304. In another example, the RB bundling behavior can be hardcoded, configured, or otherwise specified in the device 304 and/or access point 302.

Figure 4:
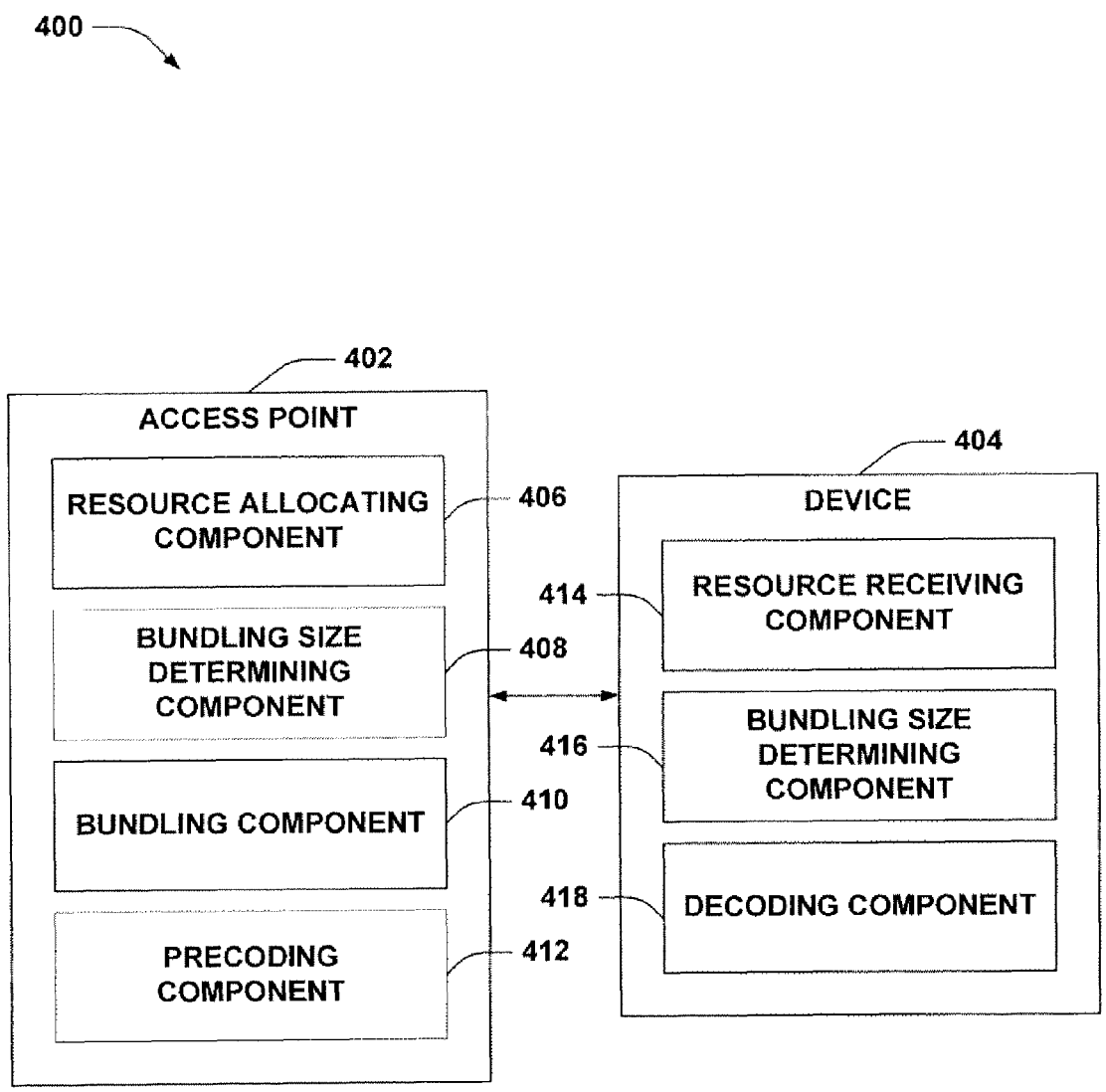
FIG. 4 is a block diagram of a system for determining a RB bundling size for a resource allocation with a bandwidth extension.

FIG. 4 illustrates a system 400 for determining a RB bundling size for bandwidth allocations that include at least one bandwidth extension. System 400 includes an access point 402 that provides wireless network access to a device 404. As described, access point 402 can be a macrocell, femtocell, picocell, or similar access point, a mobile base station, relay, etc., and device 404 can be a UE, modem, etc Access point 402 includes a resource allocating component 406 for associating one or more bandwidth allocations with a device for communicating therewith, a bundling size determining component 408 for obtaining a RB bundling size to utilize in bundling RBs for applying a precoder thereto, a bundling component 410 for bundling RBs according to the RB bundling size, and a precoding component 412 for applying a similar precoding to the bundled RBs. Device 404 includes a resource receiving component 414 for obtaining a resource allocation from an access point, a bundling size determining component 416 for discerning a bundling size for RBs communicated over the resource allocation, and a decoding component 418 for remove a precoding from a plurality of RBs according to the bundling size.

According to an example, resource allocating component 406 can determine a resource allocation for device 404 for communicating therewith. In one example, resource allocating component 406 can specify a base bandwidth allocation related to a wireless communication technology along with a bandwidth extension related to the same or a different wireless communication technology, as described. Resource receiving component 414 can obtain the resource allocation, and can utilize the resources for receiving communications from access point 402, transmitting to the access point 402, and/or the like. In addition, bundling size determining component 408 can select a RB bundling size for bundling RBs over the bandwidth and/or the bandwidth extension for similar precoding, as described above.

In one example, bundling size determining component 408 can select a joint bundling size for communications over the bandwidth and the bandwidth extension. For example, bundling size determining component 408 can determine a RB bundling size of the bandwidth, and/or a RB bundling size of the bandwidth plus the bandwidth extension (e.g., the RB bundling size can be based on the total bandwidth size). Based on the RB bundling size, bundling component 410 can determine RBs for subsequent bundling over the bandwidth and bandwidth extension, and precoding component 412 can apply the same precoder to the bundled RBs. Access point 402 can communicate the precoded RBs to device 404.

In this example, bundling size determining component 416 can obtain the joint RB bundling size for the bandwidth and bandwidth extension. In one example, bundling size determining components 408 and 416 can discern the RB bundling size for the bandwidth and bandwidth extension according to a hardcoding, configuration, etc., within or specified to access point 402 and device 404, respectively. In this example, bundling size determining component 416 can determine the RB bundling size for the bandwidth and bandwidth extension based at least in part on a RB bundling size for the bandwidth (e.g., as received from access point 402, determined based on the bandwidth size, etc.), and/or a RB bundling size for the bandwidth combined with the bandwidth extension (e.g., similarly as received from access point 402, determined based on the bandwidth size plus the bandwidth extension size, etc.). In either case, decoding component 418 can remove a determined precoding from the bundled RBs according to the RB bundling size.

In another example, bundling size determining component 408 can utilize different bundling size for RBs communicated over the bandwidth and RBs communicated over the bandwidth extension, and bundling size determining component 416 can utilize the RB bundling sizes for removing a precoding. Again, bundling size determining components 408 and 416 can determine that independent bundling is to be used with the bandwidth portion and bandwidth extension portion(s) of the resource allocation via hardcoding, configuration, or other specification at access point 402 and device 404, respectively. Moreover, bundling size determining components 408 and 416 can determine the RB bundling sizes based at least in part on a size of the bandwidth and a size of the transmission bandwidth.

In one example, a hardcoding, configuration, etc., can be specified at access point 402 and/or device 404 for computing the RB bundling size based at least in part on the bandwidth and/or bandwidth extension size, which can include a formula, a mapping (e.g., 3 RB for 10 MHz, 2 RB for 5 MHz, etc.), and/or the like. In any case, it is to be appreciated that bundling size determining component 408 can alternatively notify device 404 of the selected RB bundling size(s), transmission bandwidths, etc., and/or whether to apply bundling jointly or individually to the bandwidth and bandwidth extension, and bundling size determining component 416 can use the notification instead of or in addition to determining as described above.

Figure 5:
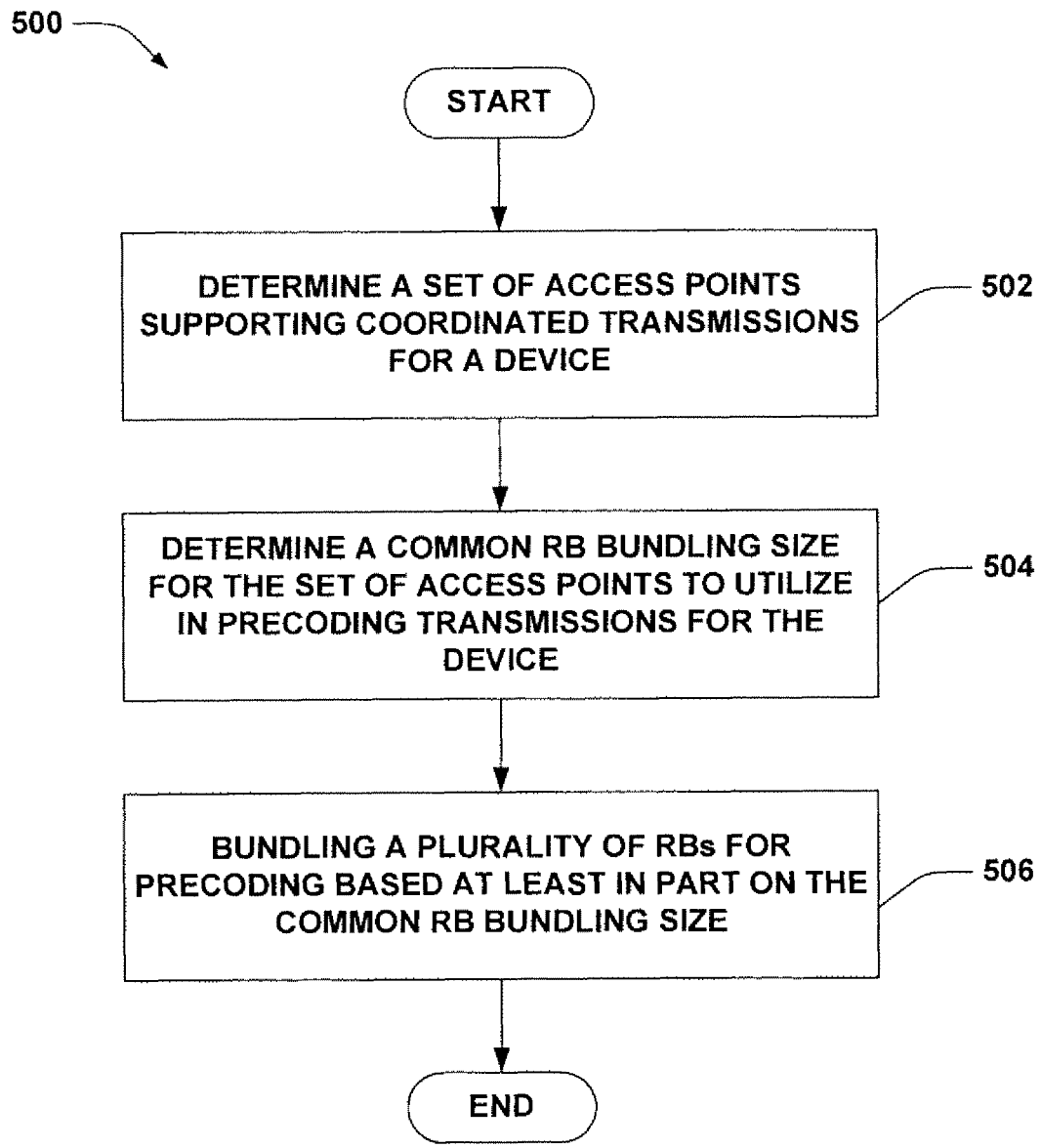
FIG. 5 is a flow chart of a method for determining a RB bundling size for access points that coordinate transmission to a device.
Figure 6:
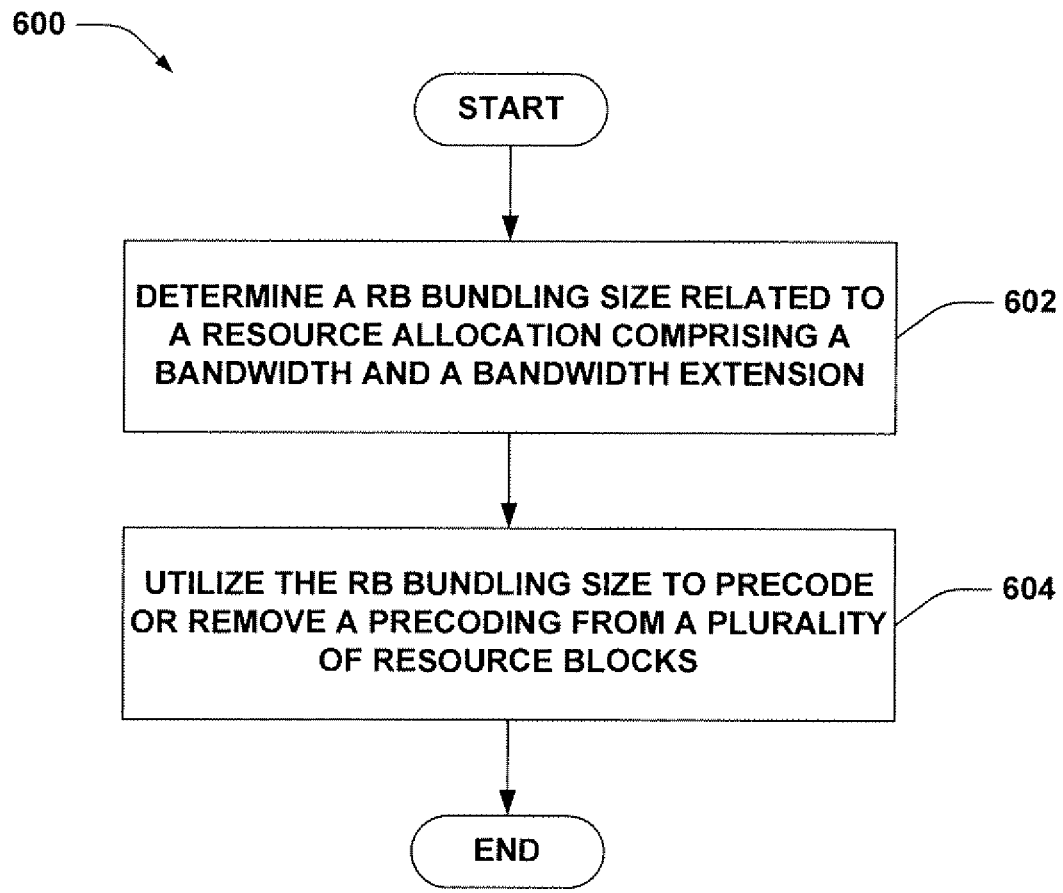
FIG. 6 is a flow chart of a method for determining a RB bundling size for resource allocations including a bandwidth extension.

Referring to FIGS. 5-6, illustrated are methods relating to determining RB bundling sizes where different transmission bandwidths are observed. While, for purposes of simplicity of explanation, the methods are shown and described as a series of acts, it is to be understood and appreciated that the methods are not limited by the order of acts, as some acts may, in accordance with one or more embodiments, occur in different orders and/or concurrently with other acts from that shown and described herein. For example, it is to be appreciated that a method could alternatively be represented as a series of interrelated states or events. such as in a state diagram. Moreover, not all illustrated acts may be required to implement a method in accordance with one or more embodiments.

In FIG. 5, a method 500 for determining a RB bundling size for a set of access points providing coordinated transmission is illustrated. At 502, a set of access points supporting coordinated transmissions for a device can be determined. For example, the access points can be in a CoMP set, which can be stored and indicated by the device, by a serving access point in the CoMP set, etc. In addition, the set can apply for a given time duration, for a given transmission, and/or the like. At 504, a common RB bundling size can be determined for the set of access points to utilize in precoding transmissions for the device. The common RB bundling size can be determined, for example, such that all access points in the set use the same RB bundling size in communicating with the device. In one example, the common RB bundling size can be determined as that used by a serving access point in the set (e.g., based on a transmission bandwidth of the serving access point). In another example, the common RB bundling size can be computed as a function of a local RB bundling size based on a local transmission bandwidth and one or more other RB bundling sizes used by other access points in the set. In yet another example, the common RB bundling size can be set to zero based on the set of access points supporting coordinated transmissions for the device. At 506, a plurality of RBs can be bundled for applying a precoding thereto based at least in part on the common RB bundling size. In an example, the precoded RBs can be transmitted to the device. Thus, the common RB bundling size can be additionally communicated to the device.

In FIG. 6, a method 600 for determining a RB bundling size for a resource allocation is illustrated. At 602, a RB bundling size can be determined related to a resource allocation comprising a bandwidth and a bandwidth extension. For example, the bandwidth extension can be allocated to provide additional bandwidth to improve communications, increase data rate, etc., as described. The RB bundling size for the resource allocation can be determined jointly for the bandwidth and the bandwidth extension, and/or individually. Where the RB bundling size is determined jointly, the RB bundling size can be determined based on the bandwidth alone or on the bandwidth and the bandwidth extension together (e.g., based on a size thereof), as described. At 604, the RB bundling size can be utilized to precode or remove precoding from a plurality of resource blocks. This can include grouping the RBs to apply or remove a similar precoding.

It will be appreciated that, in accordance with one or more aspects described herein, inferences can be made regarding determining a RB bundling size, and/or the like, as described. As used herein, the term "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 7:
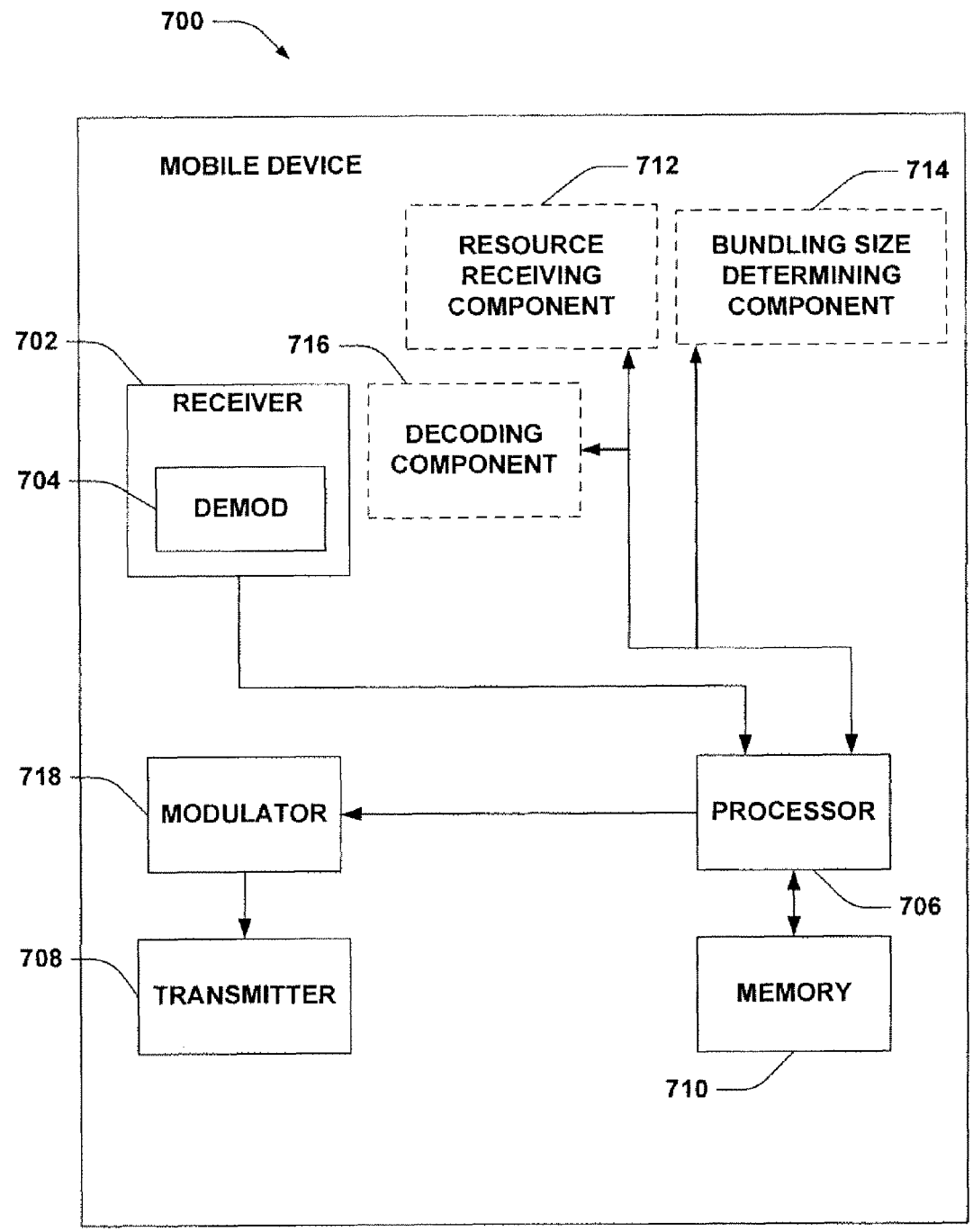
FIG. 7 is a block diagram of a mobile device for determining a RB bundling size for resource allocations including a bandwidth extension.

FIG. 7 illustrates a mobile device 700 that facilitates determining a RB bundling size for a resource allocation. Mobile device 700 includes a receiver 702 that receives a signal from, for instance, a receive antenna (not shown), performs various actions on (e.g., filters, amplifies, downconverts, etc.) the received signal, and digitizes the conditioned signal to obtain samples. Receiver 702 can comprise a demodulator 704 that can demodulate received symbols and provide them to a processor 706 for channel estimation. Processor 706 can be a processor dedicated to analyzing information received by receiver 702 and/or generating information for transmission by a transmitter 708, a processor that controls one or more components of mobile device 700, and/or a processor that both analyzes information received by receiver 702, generates information for transmission by transmitter 708, and controls one or more components of mobile device 700.

Mobile device 700 may further include memory 710 that is operatively coupled to processor 706 and that can store data to be transmitted, received data, information related to available channels, data associated with analyzed signal and/or interference strength, information related to an assigned channel, power, rate, or the like, and any other suitable information for estimating a channel and communicating via the channel. Memory 710 can additionally store protocols and/or algorithms associated with determining a RB bundling size.

Processor 706 can further be optionally operatively coupled to resource receiving component 712 (which may be similar to resource receiving component 414), a bundling size determining component 714 (which may be similar to bundling size determining component 416) and/or a decoding component 716 (which may be similar to decoding component 418). Mobile device 700 further includes a modulator 718 that modulates signals for transmission by transmitter 708 to, for instance, a base station, another mobile device, etc. For example, decoding component 716 can remove a precoding from signals received by receiver 702 and demodulated by demodulator 704 based on a RB bundling size determined by bundling size determining component 714. Although depicted as being separate from the processor 706, it is to be appreciated that the resource receiving component 712, bundling size determining component 714, decoding component 716, demodulator 704, and/or modulator 718 can be part of the processor 706 or multiple processors (not shown), and/or stored as instructions in memory 710 for execution by processor 706.

Figure 8:
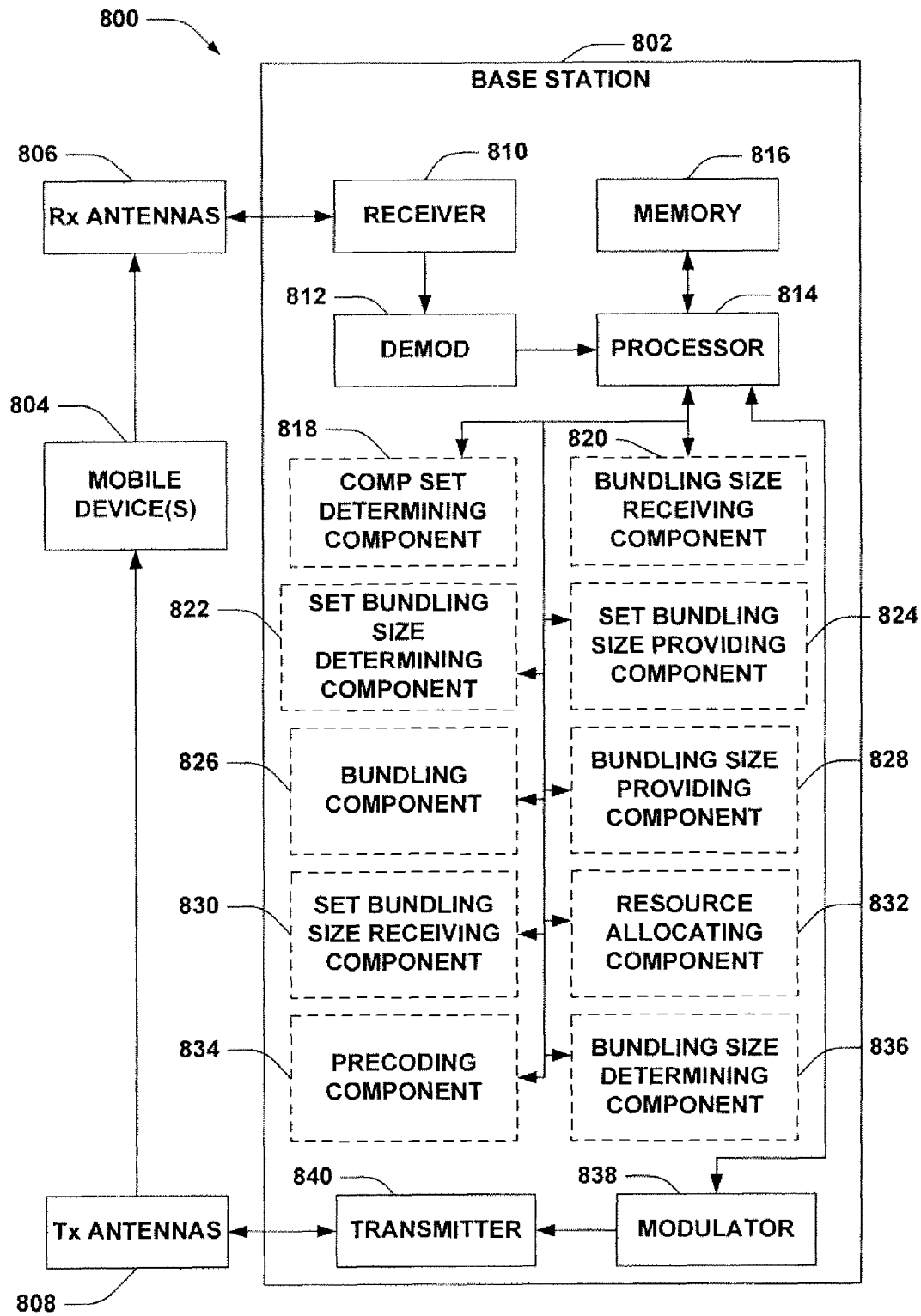
FIG. 8 is a block diagram of a system for determining RB bundling sizes.

FIG. 8 illustrates a system 800 that facilitates communicating with one or more devices using wireless communications. System 800 includes a base station 802, which can be substantially any base station (e.g., a femtocell, picocell, mobile base station, a relay, etc.), having a receiver 810 that receives signal(s) from one or more mobile devices 804 through a plurality of receive antennas 806 (e.g., which can be of multiple network technologies, as described), and a transmitter 840 that transmits to the one or more mobile devices 804 through a plurality of transmit antennas 808 (e.g., which can be of multiple network technologies, as described). Receiver 810 can receive information from one or more receive antennas 806 and is operatively associated with a demodulator 812 that demodulates received information. In addition, in an example, receiver 810 can receive from a wired backhaul link. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), determining a RB bundling size for applying a precoding, and/or any other suitable information related to performing the various actions and functions set forth herein.

Processor 814 is further optionally coupled to a CoMP set determining component 818, which can be similar to CoMP set determining component 208, a bundling size receiving component 820 (which may be similar to bundling size receiving component 210), a set bundling size determining component 822 (which may be similar to set bundling size determining component 212), a set bundling size providing component 824 (which may be similar to set bundling size providing component 214), and/or a bundling component 826 (which may be similar to bundling components 216, 222, and/or 410). In addition, processor 814 is further optionally coupled to a bundling size providing component 828 (which may be similar to bundling size providing component 218), and/or a set bundling size receiving component 830 (which may be similar to set bundling size receiving component 220). Moreover, processor 814 is optionally coupled to a resource allocating component 832 (which may be similar to resource allocating component 406), a precoding component 834 (which may be similar to precoding component 412), and/or a bundling size determining component 836 (which may be similar to bundling size determining component 408).

Moreover, for example, processor 814 can modulate signals to be transmitted using modulator 838, and transmit modulated signals using transmitter 840. Transmitter 840 can transmit signals to mobile devices 804 over Tx antennas 808. Furthermore, although depicted as being separate from the processor 814, it is to be appreciated that the CoMP set determining component 818, bundling size receiving component 820, set bundling size determining component 822, set bundling size providing component 824, bundling component 826, bundling size providing component 828, set bundling size receiving component 830, resource allocating component 832, precoding component 834, bundling size determining component 836, demodulator 812, and/or modulator 838 can be part of the processor 814 or multiple processors (not shown), and/or stored as instructions in memory 816 for execution by processor 814.

Figure 9:
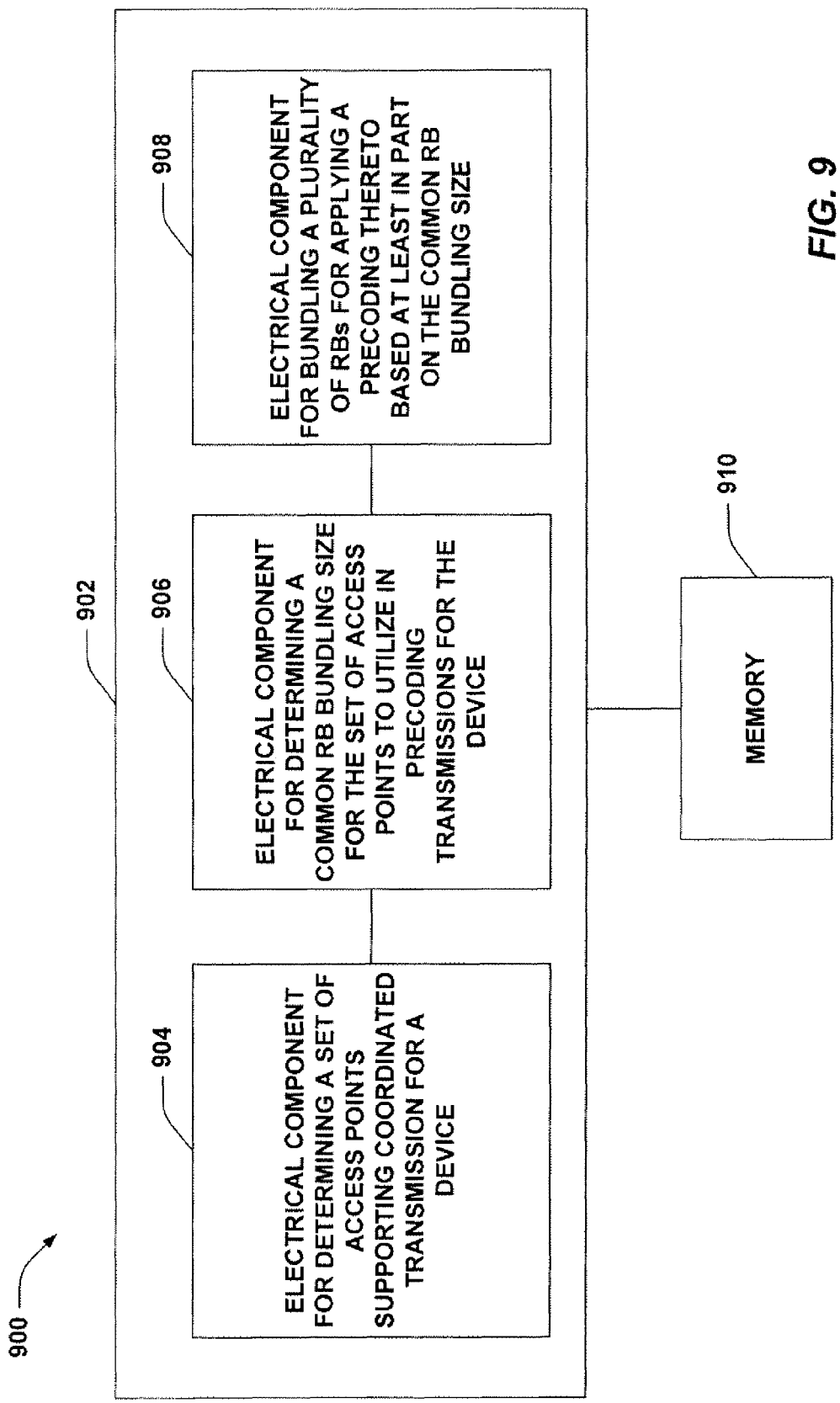
FIG. 9 is a block diagram of a system for determining a RB bundling size for access points that coordinate transmission for a device.

Referring to FIG. 9, illustrated is a system 900 that determines a RB bundling size for access points supporting coordinated transmission for a device. For example, system 900 can reside at least partially within an access point. It is to be appreciated that system 900 is represented as including functional blocks, which can be functional blocks that represent functions implemented by a processor, software, or combination thereof. System 900 includes a logical grouping 902 of electrical components that can act in conjunction. For instance, logical grouping 902 can include an electrical component 904 for determining a set of access points supporting coordinated transmission for a device. A described, the set of access points can correspond to a CoMP set as indicated by the device, by a serving access point in the CoMP set, etc. Further, logical grouping 902 can comprise an electrical component 906 for determining a common RB bundling size for the set of access points to utilize in precoding transmissions for the device.

For example, electrical component 906 can determine the common RB bundling size as a local RB bundling size where system 900 is a serving access point in a CoMP set, as a function of RB bundling sizes of access points in the CoMP set, etc., as described. Moreover, electrical component 906 can determine the common RB bundling size as zero to disable RB bundling in CoMP communications. Logical grouping 902 can also comprise an electrical component 908 for bundling a plurality of RBs for applying a precoding thereto based at least in part on the common RB bundling size. For example, electrical component 904 can include a CoMP set determining component 208, as described above. In addition, electrical component 906 can include a set bundling size determining component 212, as described above. Moreover, electrical component 908 can include a bundling component 216, etc.

Additionally, system 900 can include a memory 910 that retains instructions for executing functions associated with the electrical components 904, 906, and 908. While shown as being external to memory 910, it is to be understood that one or more of the electrical components 904, 906, and 908 can exist within memory 910. In one example, electrical components 904, 906, and 908 can comprise at least one processor, or each electrical component 904, 906, and 908 can be a corresponding module of at least one processor. Moreover, electrical components 904, 906, and 908 can be a computer program product comprising a computer readable medium, where each electrical component 904, 906, and 908 can be corresponding code or instructions.

Figure 10:
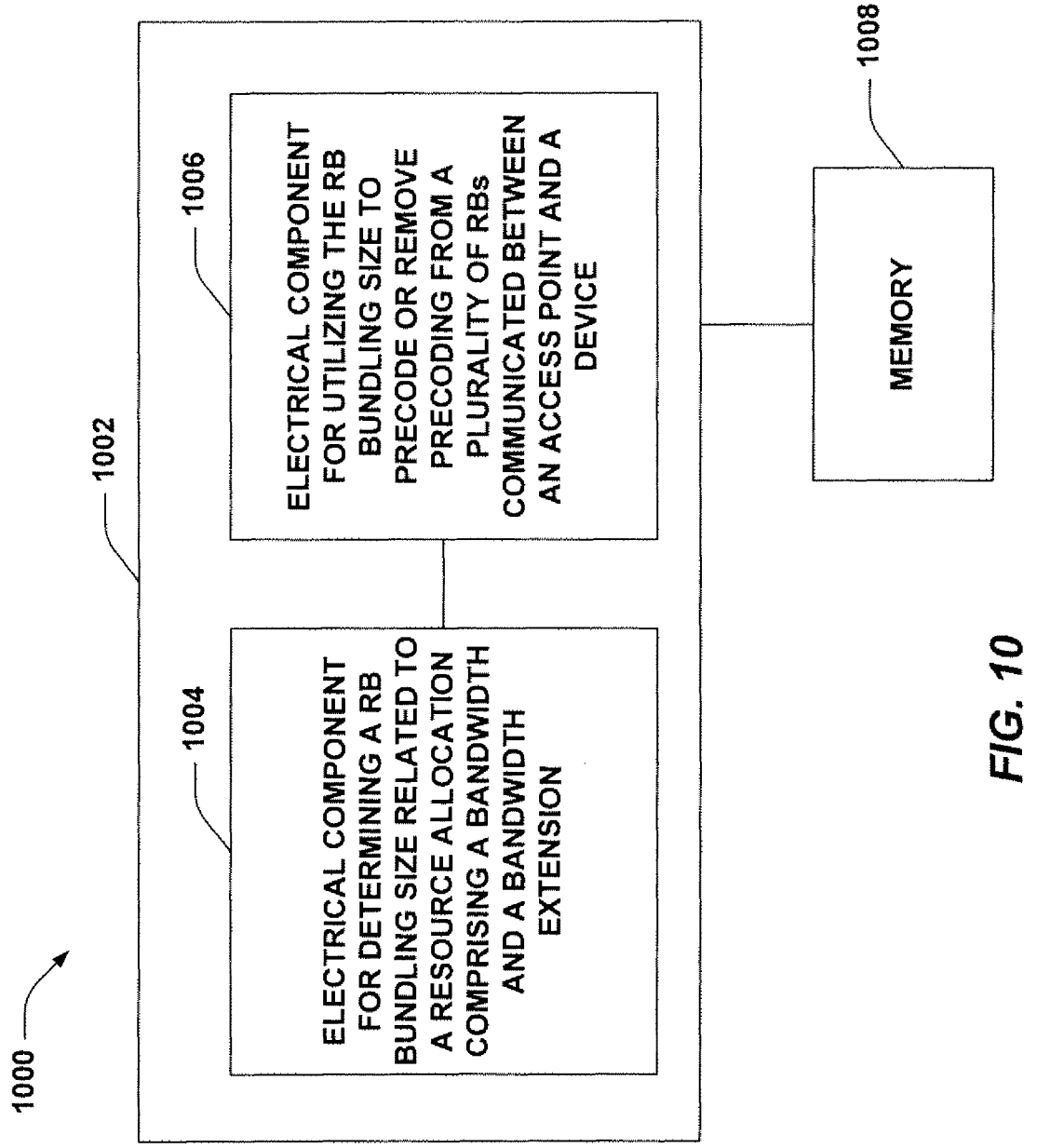
FIG. 10 is a block diagram of a system that determines a RB bundling size for resource allocations including a bandwidth extension.

Referring to FIG. 10, illustrated is a system 1000 that determines a RB bundling size for a resource allocation. For example, system 1000 can reside at least partially within an access point, wireless device, etc. It is to be appreciated that system 1000 is represented as including functional blocks, which can be functional blocks that represent functions implemented by a processor, software, or combination thereof. System 1000 includes a logical grouping 1002 of electrical components that can act in conjunction. For instance, logical grouping 1002 can include an electrical component 1004 for determining a RB bundling size related to a resource allocation comprising a bandwidth and a bandwidth extension. As described, this can include determining the RB bundling size jointly for the bandwidth and bandwidth extension or individually. In addition, for example, where electrical component 1004 determines the RB bundling size jointly, it can do so based on the bandwidth alone or on the bandwidth combined with the bandwidth extension (e.g., based on a size thereof).

Further, logical grouping 1002 can comprise an electrical component 1006 for utilizing the RB bundling size to precode or remove a precoding from a plurality of RBs communicated between an access point and a device. For example, electrical component 1004 can comprise bundling size determining components 408 and/or 416. Moreover, electrical component 1006 can include a precoding component 412 and/or decoding component 418.

Additionally, system 1000 can include a memory 1008 that retains instructions for executing functions associated with the electrical components 1004 and 1006. While shown as being external to memory 1008, it is to be understood that one or more of the electrical components 1004 and 1006 can exist within memory 1008. In one example, electrical components 1004 and 1006 can comprise at least one processor, or each electrical component 1004 and 1006 can be a corresponding module of at least one processor. Moreover, electrical components 1004 and 1006 can be a computer program product comprising a computer readable medium, where each electrical component 1004 and 1006 can be corresponding code or instructions.

Figure 11:
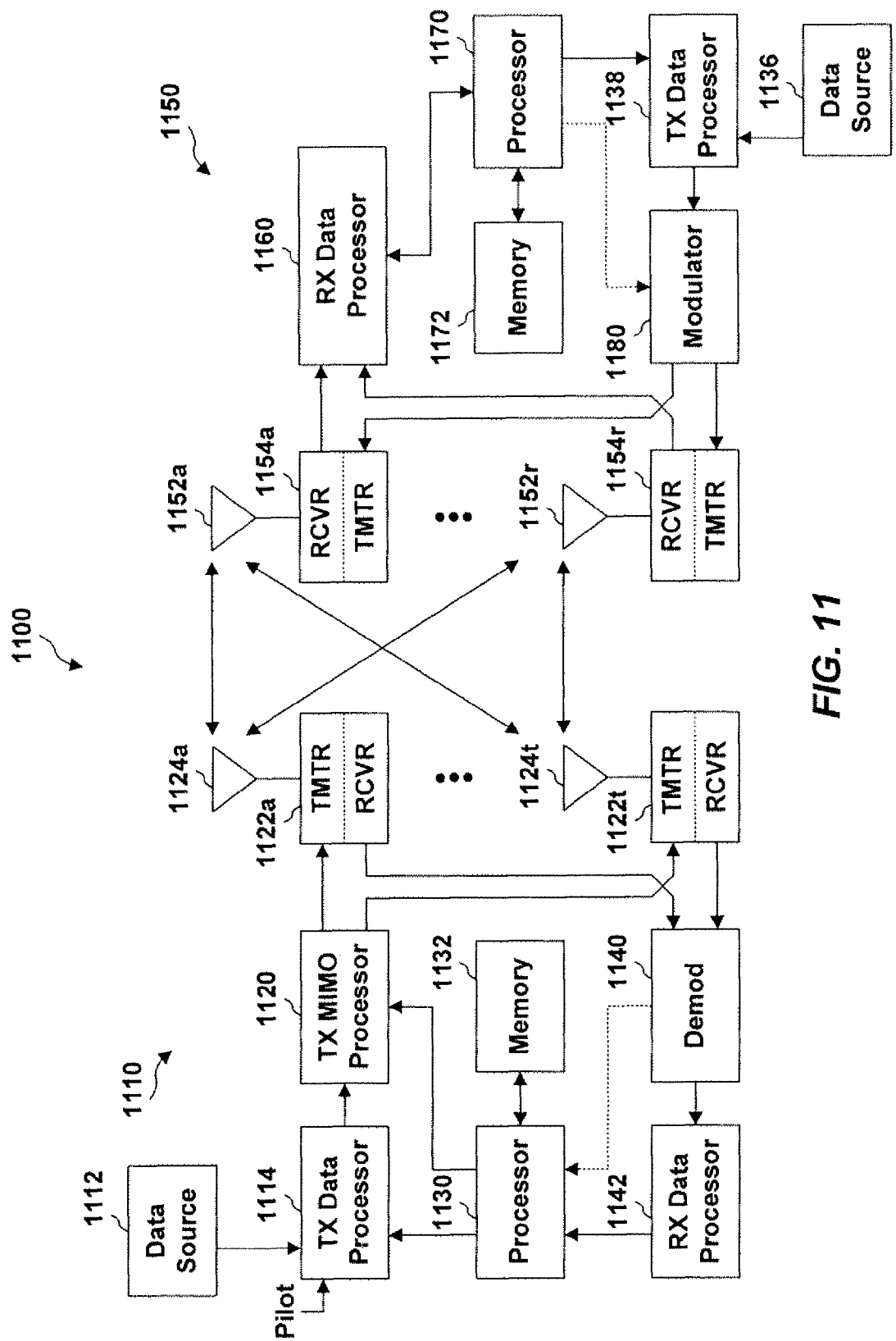
FIG. 11 is a block diagram of a wireless network environment that can be employed in conjunction with the various systems and methods described herein.

FIG. 11 illustrates a wireless communication system 1100. The system 1100 depicts one base station 1110 and one mobile device 1150 for sake of brevity. However, it is to be appreciated that system 1100 can include more than one base station and/or more than one mobile device, wherein additional base stations and/or mobile devices can be substantially similar or different from example base station 1110 and mobile device 1150 described below. In addition, it is to be appreciated that base station 1110 and/or mobile device 1150 can employ the systems (FIGS. 1-4 and 8-10), methods (FIGS. 5-6). and/or mobile devices (FIG. 7) described herein to facilitate wireless communication there between. For example, components or functions of the systems and/or methods described herein can be part of a memory 1132 and/or 1172 or processors 1130 and/or 1170 described below, and/or can be executed by processors 1130 and/or 1170 to perform the disclosed functions.

At base station 1110, traffic data for a number of data streams is provided from a data source 1112 to a transmit (TX) data processor 1114. According to an example, each data stream can be transmitted over a respective antenna. TX data processor 1114 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1150 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1130.

The modulation symbols for the data streams can be provided to a TX MIMO processor 1120, which can further process the modulation symbols (e.g., for OFDM). TX MIMO processor 1120 then provides $N_T$ modulation symbol streams to $N_T$ transmitters (TMTR) 1122a through 1122t. In various embodiments, TX MIMO processor 1120 applies beamforming weights to the symbols of the data streams and to the antenna from which the symbol is being transmitted.

Each transmitter 1122 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1122a through 1122t are transmitted from $N_T$ antennas 1124a through 1124t, respectively.

At mobile device 1150, the transmitted modulated signals are received by $N_R$ antennas 1152a through 1152r and the received signal from each antenna 1152 is provided to a respective receiver (RCVR) 1154a through 1154r. Each receiver 1154 conditions (e.g., filters, amplifies, and downconverts) a respective signal, digitizes the conditioned signal to provide samples, and further processes the samples to provide a corresponding "received" symbol stream.

An RX data processor 1160 can receive and process the $N_R$ received symbol streams from $N_R$ receivers 1154 based on a particular receiver processing technique to provide $N_T$ "detected" symbol streams. RX data processor 1160 can demodulate, deinterleave, and decode each detected symbol stream to recover the traffic data for the data stream. The processing by RX data processor 1160 is complementary to that performed by TX MIMO processor 1120 and TX data processor 1114 at base station 1110.

The reverse link message can comprise various types of information regarding the communication link and/or the received data stream. The reverse link message can be processed by a TX data processor 1138, which also receives traffic data for a number of data streams from a data source 1136, modulated by a modulator 1180, conditioned by transmitters 1154a through 1154r, and transmitted back to base station 1110.

At base station 1110, the modulated signals from mobile device 1150 are received by antennas 1124, conditioned by receivers 1122, demodulated by a demodulator 1140, and processed by a RX data processor 1142 to extract the reverse link message transmitted by mobile device 1150. Further, processor 1130 can process the extracted message to determine which precoding matrix to use for determining the beamforming weights. Processor 1130 can thus additionally determine a RB bundling size, as described herein, for applying a precoding to a plurality of RBs. Processor 1170 can similarly determine a RB bundling size (e.g., as received or computed) for removing the precoding from the RBs as received.

Processors 1130 and 1170 can direct (e.g., control, coordinate, manage, etc.) operation at base station 1110 and mobile device 1150, respectively. Respective processors 1130 and 1170 can be associated with memory 1132 and 1172 that store program codes and data to execute functions described herein.

The various illustrative logics, logical blocks, modules, components, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Additionally, at least one processor may comprise one or more modules operable to perform one or more of the steps and/or actions described above. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a terminal. In the alternative, the processor and the storage medium may reside as discrete components in a terminal.

In one or more aspects, the functions, methods, or algorithms described may be implemented in hardware, software, firmware, or any combination thereof. If implemented in software, the functions may be stored or transmitted as one or more instructions or code on a computer-readable medium, which may be incorporated into a computer program product. Computer-readable media includes computer storage media. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs usually reproduce data optically with lasers, Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communication, comprising:
    determining a set of access points supporting coordinated transmission for a device;
    determining a common resource block bundling size for the set of access points for precoding transmissions to the device, wherein a local resource block bundling size of a serving access point from the set of access points is used as the common resource block bundling size; and
    bundling a plurality of resource blocks based at least in part on the common resource block bundling size.

2. The method of claim 1, wherein the set of access points comprise a first access point that uses a first transmission bandwidth for communicating with the device that is different from a second transmission bandwidth used by a second access point for communicating with the device.

3. The method of claim 1, further comprising communicating the common resource block bundling size to at least one access point in the set of access points over a backhaul connection.

4. The method of claim 1, wherein local resource block bundling size is based on the transmission bandwidth of the serving access point.

5. The method of claim 1, wherein determining the common resource block bundling size further comprises disabling resource block bundling when determining that the set of access points uses coordinated transmission for the device.

6. The method of claim 1, further comprising signaling the common resource block bundling size to the device.

7. An apparatus for wireless communication, comprising:
    at least one processor configured:
        to determine a set of access points supporting coordinated transmission for a device,
        to determine a common resource block bundling size for the set of access points for precoding transmissions to the device, wherein a local resource block bundling size of a serving access point from the set of access points is used as the common resource block bundling size, and
        to bundle a plurality of resource blocks based at least in part on the common resource block bundling size; and
    a memory coupled to the at least one processor.

8. The apparatus of claim 7, wherein the set of access points comprise a first access point that uses a first transmission bandwidth for communicating with the device that is different from a second transmission bandwidth used by a second access point for communicating with the device.

9. The apparatus of claim 7, wherein the at least one processor is further configured to communicate the common resource block bundling size to at least one access point in the set of access points over a backhaul connection.

10. The apparatus of claim 7, wherein the local resource block bundling size is based on the transmission bandwidth of the serving access point.

11. The apparatus of claim 7, wherein the at least one processor is configured to determine the common resource block bundling size by disabling resource block bundling when the set of access points uses coordinated transmission for the device.

12. The apparatus of claim 7, wherein the at least one processor is further configured to signal the common resource block bundling size to the device.

13. An apparatus for wireless communication, comprising:
    means for determining a set of access points supporting coordinated transmission for a device;
    means for determining a common resource block bundling size for the set of access points for precoding transmissions to the device, wherein a local resource block bundling size of a serving access point from the set of access points is used as the common resource block bundling size; and
    means for bundling a plurality of resource blocks based at least in part on the common resource block bundling size.

14. The apparatus of claim 13, wherein the set of access points comprise a first access point that uses a first transmission bandwidth for communicating with the device that is different from a second transmission bandwidth used by a second access point for communicating with the device.

15. The apparatus of claim 13, further comprising means for communicating the common resource block bundling size to at least one access point in the set of access points over a backhaul connection.

16. The apparatus of claim 13, wherein the local resource block bundling size is based on the transmission bandwidth of the serving access point.

17. The apparatus of claim 13, wherein the means for determining the common resource block bundling size comprises means for disabling resource block bundling when the set of access points uses coordinated transmission for the device.

18. The apparatus of claim 13, further comprising means for signaling the common resource block bundling size to the device.

19. A computer program product comprising a non-transitory computer-readable medium having program code stored thereon, the program code comprising:
   program code to determine a set of access points supporting coordinated transmission for a device;
   program code to determine a common resource block bundling size for the set of access points for precoding transmissions to the device, wherein a local resource block bundling size of a serving access point from the set of access points is used as the common resource block bundling size; and
   program code to bundle a plurality of resource blocks based at least in part on the common resource block bundling size.

20. The computer program product of claim 19, wherein the set of access points comprise a first access point that uses a first transmission bandwidth for communicating with the device that is different from a second transmission bandwidth used by a second access point for communicating with the device.

21. The computer program product of claim 19, wherein the program code further comprises program code to communicate the common resource block bundling size to at least one access point in the set of access points over a backhaul connection.

22. The computer program product of claim 19, wherein the local resource block bundling size is based on the transmission bandwidth of the serving access point.

23. The computer program product of claim 19, wherein the program code further comprises program code to disable resource block bundling when the set of access points uses coordinated transmission for the device.

24. The computer program product of claim 19, wherein the program code further comprises program code to signal the common resource block bundling size to the device.

25. A method of wireless communication, comprising:
   determining, at a user equipment (UE) for a resource allocation, a common resource block bundling size for receiving precoded transmissions from at least one access point from a set of access points that support coordinated transmission to the UE, wherein a local resource block bundling size of a serving access point from the set of access points is used as the common resource block bundling size; and
   utilizing, at the UE, the common resource block bundling size to process a plurality of resource blocks.

26. The method of claim 25, wherein a transmission bandwidth extension is used for communications between the UE and at least one access point of the set of access points, and wherein the determining further comprising determining the common resource block bundling size based on the local resource block bundling size and the transmission bandwidth extension.

27. The method of claim 26, wherein the determining further comprises:
   determining a first resource block bundling size for a first portion of the resource allocation based on the local resource block bundling size; and
   determining a second resource block bundling size for a second portion of the resource allocation based on the transmission bandwidth extension.

28. A user equipment (UE) for wireless communication, comprising:
   at least one processor configured:
      to determine, for a resource allocation, a common resource block bundling size for receiving precoded transmissions from at least one access point from a set of access points that support coordinated transmission to the UE, wherein a local resource block bundling size of a serving access point from the set of access points is used as the common resource block bundling size; and
      to utilize the common resource block bundling size to process a plurality of resource blocks; and
   a memory coupled to the at least one processor.

29. The UE of claim 28, wherein a transmission bandwidth extension is used for communications between the UE and at least one access point of the set of access points, and wherein the at least one processor is further configured to determine the common resource block bundling size based on the local resource block bundling and the transmission bandwidth extension.

30. The UE of claim 29, wherein the at least one processor is further configured to determine the resource block bundling size by:
   determining a first resource block bundling size for a first portion of the resource allocation based on the local resource block bundling; and
   determining a second resource block bundling size for a second portion of the resource allocation based on the transmission bandwidth extension.

31. An apparatus for wireless communication, comprising:
   means for determining, at a user equipment (UE) for a resource allocation, a common resource block bundling size for receiving precoded transmissions from at least one access point from a set of access points that support coordinated transmission to the UE, wherein a local resource block bundling size of a serving access point from the set of access points is used as the common resource block bundling size; and
   means for utilizing, at the UE, the common resource block bundling size to process a plurality of resource blocks.

32. The apparatus of claim 31, wherein a transmission bandwidth extension is used for communications between the UE and at least one access point of the set of access points, and wherein the means for determining comprises means for determining the common resource block bundling size based on the local resource block bundling size and the transmission bandwidth extension.

33. The apparatus of claim 32, wherein the means for determining comprises:
   means for determining a first resource block bundling size for a first portion of the resource allocation based on the local resource block bundling size; and
   means for determining a second resource block bundling size for a second portion of the resource allocation based on the transmission bandwidth extension.

34. A computer program product comprising a non-transitory computer-readable medium having program code stored thereon, the program code comprising:
   program code to determine, at a user equipment (UE) for a resource allocation, a common resource block bundling size for receiving precoded transmissions from at least one access point from a set of access points that support coordinated transmission to the UE, wherein a local resource block bundling size of a serving access point from the set of access points is used as the common resource block bundling size; and program code to utilize, at the UE, the common resource block bundling size to process a plurality of resource blocks.

35. The computer program product of claim 34, wherein a transmission bandwidth extension is used for communications between the UE and at least one access point of the set of access points, and wherein the program code further comprises program code to determine the common resource block bundling size based on the local resource block bundling size and the transmission bandwidth extension.

36. The computer program product of claim 35, wherein the program code to determine comprises:
- program code to determine a first resource block bundling size for a first portion of the resource allocation based on the local resource block bundling size; and
- program code to determine a second resource block bundling size for a second portion of the resource allocation based on the transmission bandwidth extension.

37. The method of claim 25, wherein the common resource block bundling size is used to precode or remove precoding from the plurality of resource blocks.

38. The method of claim 25, wherein the determining the common resource block bundling size comprises receiving the common resource block bundling size from at least one of the access points of the set of access points.

* * * * *